(12) United States Patent
Albright et al.

(10) Patent No.: US 7,766,105 B2
(45) Date of Patent: Aug. 3, 2010

(54) SYSTEM AND METHOD OF IMPLEMENTING A SOFT-START PTO CLUTCH

(75) Inventors: Chris Albright, Brodhead, WI (US); Claude McFarlane, Fitchburg, WI (US)

(73) Assignee: Kuhn North America, Inc., Brodhead, WI (US)

(*) Notice: Subject to any disclaimer, the term of this patent is extended or adjusted under 35 U.S.C. 154(b) by 1035 days.

(21) Appl. No.: 11/374,055

(22) Filed: Mar. 14, 2006

(65) Prior Publication Data

US 2006/0214035 A1    Sep. 28, 2006

Related U.S. Application Data

(60) Provisional application No. 60/594,127, filed on Mar. 14, 2005.

(51) Int. Cl.
*B60K 25/08* (2006.01)

(52) U.S. Cl. .................. 180/53.61; 180/53.7; 701/51; 701/67

(58) Field of Classification Search ............. 180/53.6, 180/53.61, 53.62, 53.7, 53.8, 293, 367; 701/50, 701/67, 5, 671; 172/15.66, 15.69, 15.86
See application file for complete search history.

(56) References Cited

U.S. PATENT DOCUMENTS

| | | | | |
|---|---|---|---|---|
| 4,161,991 A | * | 7/1979 | van der Lely | 180/53.7 |
| 4,535,859 A | * | 8/1985 | van der Lely | 180/15 |
| 4,618,016 A | * | 10/1986 | van der Lely | 180/53.6 |
| 4,899,525 A | * | 2/1990 | Takei et al. | 56/202 |
| 5,226,497 A | * | 7/1993 | Beaton | 180/53.4 |
| 6,134,494 A | * | 10/2000 | Stelzle et al. | 701/50 |
| 6,205,385 B1 | * | 3/2001 | Stelzle et al. | 701/50 |
| 6,237,708 B1 | * | 5/2001 | Kawada | 180/53.7 |
| 6,308,441 B1 | * | 10/2001 | Bolitho | 37/411 |
| 6,742,290 B2 | * | 6/2004 | Hanafusa | 37/248 |
| 7,048,106 B2 | * | 5/2006 | Hou | 192/103 F |
| 7,431,108 B2 | * | 10/2008 | Tarasinski et al. | 180/53.6 |

* cited by examiner

*Primary Examiner*—Toan C To
(74) *Attorney, Agent, or Firm*—Oblon, Spivak, McClelland, Maier & Neustadt, L.L.P.

(57) ABSTRACT

A soft start clutch system and method of implementing a soft start clutch system including a soft start clutch configured to drivingly connect to a machinery drive input to an engine transmission, including a transmission PTO attached to the transmission and drivingly connected to the soft start clutch, and a control circuit configured to engage the soft start clutch at a first rate and configured to disengage the soft start clutch at a second rate which is different than the first rate.

28 Claims, 5 Drawing Sheets

SYSTEM AND METHOD OF IMPLEMENTING A SOFT-START PTO CLUTCH

BACKGROUND OF THE INVENTION

1. Field of the Invention

This invention relates to a soft-start clutch application for equipment configured to be mounted on vehicles or towed by tractors.

2. Background of the Invention

Many types of machines are routinely mounted on vehicle chassis or trailers for easier transportation and use. This is especially true for large agricultural equipment. This machinery includes many types of feed mixers and manure spreaders for use in dairy, beef, and livestock operations. The equipment is typically powered through a transmission PTO (power take-off) driven by the vehicle engine. Depending on the type of transmission available on the vehicle chassis, the way power is supplied to the machine will vary.

In the case of a manual transmission, the gears driving the transmission PTO are manually disengaged while the transmission's clutch is depressed. When the transmission clutch is released, the PTO rotates and the machinery is engaged. Thus, the PTO rotates or stops along with the vehicle's own wheels. In other words, the PTO will only run when the vehicle chassis is in motion, as the PTO is driven by the vehicle transmission gears and not driven directly by the engine. The operation of this type of manual transmission PTO is more difficult than operation of an automatic transmission, so most livestock operations prefer a vehicle chassis with an automatic transmission.

In the case of a traditional automatic transmission, the PTO is powered by the automatic transmission's torque converter. The PTO uses a set of small clutch discs, which allow engagement and disengagement of the PTO. One benefit of using a torque converter to power the PTO is that the torque converter is in effect a hydraulic pump, and therefore inherently allows the PTO to slip somewhat during startup. Because of the slippage produced by the torque converter, the PTO clutch discs experience less of a shock or torque spike upon startup than would occur without the presence of the torque converter. The disadvantage of connecting to the torque converter is that it is continuously slipping, resulting in efficiency losses and less power available at the PTO. In addition, it also means that the PTO operates only when the vehicle is moving or in neutral. Further, the PTO gear ratios available for these types of transmissions are limited, which restricts the machinery which can be mounted on the truck chassis.

In recent years, vehicle manufacturers have incorporated automatic transmissions without torque converters. One example of such a transmission is the new style Allison WORLD CLASS® automatic transmission which drives the PTO gears directly from the engine. This arrangement allows full horsepower to be transferred to the PTO whenever the truck engine is running, providing "live power." Internal PTO clutches engage and disengage the PTO independently of the vehicle transmission, and no torque converter is present between the PTO and the engine to act as a buffer. Consequently, conventional PTO clutches operating heavy equipment, with running torque loads of 100 hp or above for example, experience severe torque spikes upon startup. Such high torque loads are common for manure spreaders and feed mixers. The torque spike can be in the range of 2-3 times the running torque. Accordingly, such torque spikes cause conventional PTO clutches to wear out faster when operated with an automatic transmission without a torque converter than when operated with a transmission with a torque converter. In other words, the disadvantage of the automatic transmission without a torque converter is that there is no buffer to prevent full engine horsepower from being engaged instantaneously, resulting in considerable shock and stress on both the driven machinery and the PTO itself.

As a solution to the above-noted problems, operators of equipment have resorted to using hydraulic motors to power moving components of equipment. The hydraulic motors allow control of the machinery independently of the rotation or existence of a dedicated PTO. Additionally, hydraulic motor systems allow the driven machinery to rotate in both the clockwise and counter-clockwise directions without special provisions made in gearing. However, hydraulic motor systems are relatively expensive and complex compared to conventional PTO systems.

Further, a diesel truck engine (as is commonly found in agricultural vehicles) typically runs at 1800-2200 RPM, and most machinery is configured to accept a 540 or 1000 RPM input. Thus, the rotational speed of the diesel truck engine must be reduced before connection to the machinery. To achieve this reduction in rotational speed, the transmission PTO is generally specified to transmit as an output a reduced percentage of a given input rotational speed. For example, a 75% reduction PTO would accept an 1800 RPM engine speed and produce a 1350 RPM output to the machinery. However, the gear reduction choices available in conventional PTO's are limited, and generally result in a compromise of the resulting machinery speeds. In addition, the PTO gears used for speed reduction become smaller as the reduction is increased. Therefore, these gears are less capable of carrying the required torque of the machinery.

SUMMARY OF THE INVENTION

One aspect of the invention relates to the addition of a soft start clutch in line between the transmission PTO and the machinery, especially in automatic transmission without a torque converter, to reduce shock and the startup load by decreasing the torque required to accelerate the load up to speed. This arrangement may be incorporated into a truck-mounted implement or a trailer-mounted implement which is driven by a tractor PTO. The additional soft start clutch can be many different styles, including, for example, belt drive, magnetic, friction disc, centrifugal, etc, and can be actuated mechanically, hydraulically, or pneumatically. This soft start clutch may be much larger in physical size than conventional internal PTO clutches and with higher torque ratings so that it can transmit more power and last longer than conventional PTO clutches. Typically, the actuating device starts the clutch over a short period of time, allowing some slippage for a few seconds to soften the startup spike (reduce shock). One way to achieve this slippage is by regulating the flow rate or pressure of hydraulic fluid or pneumatic pressure supplied to actuate a clutch. With this arrangement, the soft start clutch would engage and disengage the power supplied to the driven machinery so that the internal PTO clutch would not be used as frequently (or even required), thus saving wear and tear on the internal PTO clutch.

In addition, a dedicated gearbox can be used in combination with the soft start clutch to reduce the PTO rotational speed from normal engine speed to the desired machinery input speed. This method of speed reduction is much more desirable than using transmission PTO gearing because the dedicated gearbox gears may be selected to be physically larger and better able to transmit high torque. Use of a dedicated gearbox also eliminates the need to rely on commercially available PTO reduction ratios, which can be very limited.

Accordingly, one aspect of the present invention is to provide a drive system for vehicle mounted agricultural equipment which addresses the problems associated with known drive systems for vehicle mounted equipment.

Another aspect of the invention is to provide a drive system with increased torque capacity due to a larger clutch engagement system.

Another aspect of the invention is to provide a drive system with increased torque capacity due to an auxiliary reduction gearbox system.

Another aspect of the invention is to provide a drive system with a "soft start" capability, which engages the machinery with a reduced torque spike.

Another aspect of the present invention provides a soft start clutch system including, a propelling vehicle with an engine and a transmission, a soft start clutch configured to drivingly connect to a machinery drive input. A transmission PTO can be attached to the transmission and drivingly connected to the soft start clutch. A control circuit can be configured to engage the soft start clutch at a first rate and configured to disengage the soft start clutch at a second rate which is slower than the first rate. In one non-limiting embodiment, the control circuit controls pressurized fluid used to actuate the soft start clutch. In one non-limiting embodiment, the soft start clutch is coupled with an agricultural implement. For example, the soft start clutch can be combined with a manure spreader or a feed mixer, either of which can be mounted to a truck or pulled behind a trailer.

Another aspect of the present invention provides a soft start clutch system including, a propelling vehicle with an engine and a transmission, a soft start clutch configured to drivingly connect to a machinery drive input, a transmission PTO attached to the transmission and drivingly connected to the soft start clutch, and means for engaging the soft start clutch at a first rate and for disengaging the soft start clutch at a second rate which is slower than the first rate.

Another aspect of the invention relates to a method of supplying rotational power to an agricultural implement including. The method includes rotating an engine output shaft connected in line with an input of a clutch. The method further includes engaging, for example, via a fluid control circuit, the input of the clutch with an output of the clutch gradually over a period of at least one second, and changing a rotational speed of the output of the clutch via a gear box.

BRIEF DESCRIPTION OF THE DRAWINGS

These and other advantages of the invention will become more apparent and more readily appreciated from the following detailed description of the exemplary embodiments of the invention taken in conjunction with the accompanying drawings, where.

DETAILED DESCRIPTION OF THE DRAWINGS

Figure 1A:
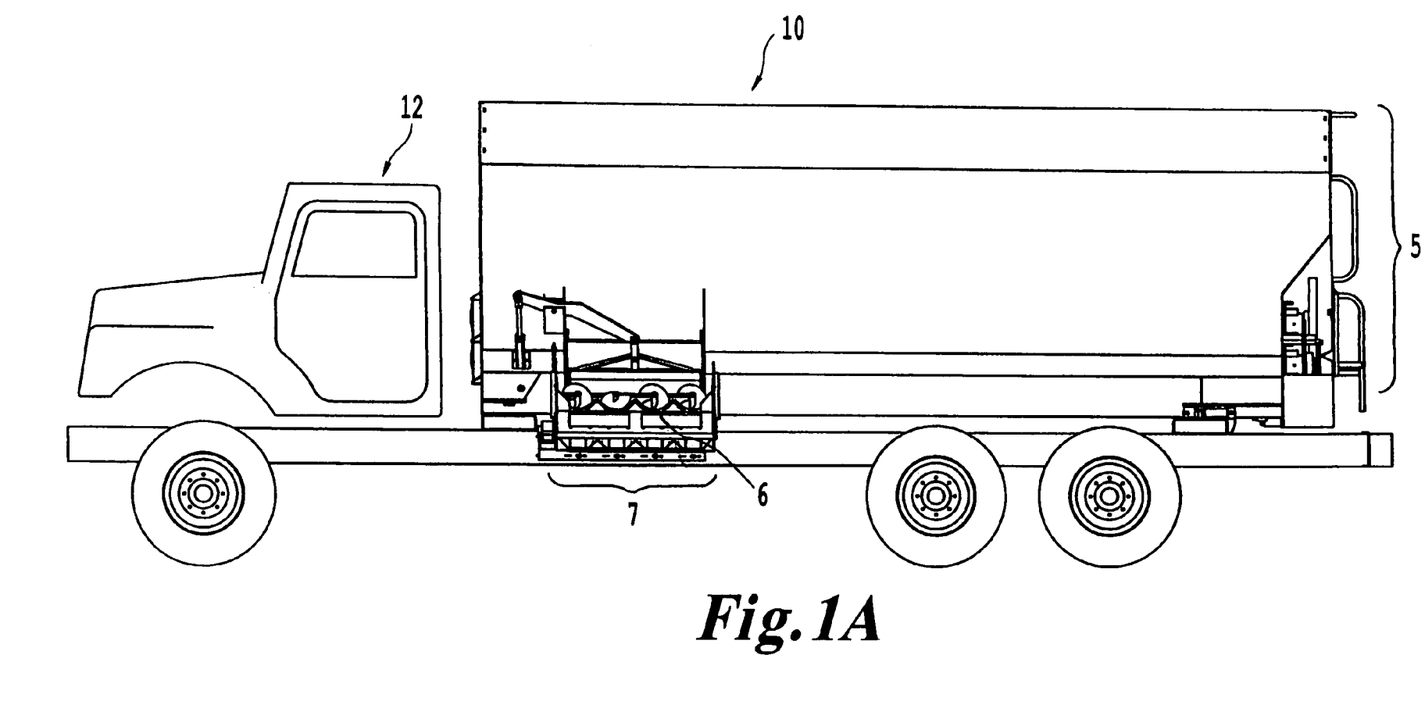
FIG. 1A is a side view of a non-limiting embodiment of agricultural equipment mounted on a truck chassis.

FIG. 1A shows a non-limiting embodiment of the invention. In this embodiment, a feed mixer 5 is shown mounted on a truck chassis 12 of a vehicle 10. The feed mixer 5 includes augers 6 used to discharge feed through discharge chute 7. A soft start clutch system, shown in FIG. 1b, drives the augers 6. Although the embodiment of FIG. 1A includes a feed mixer, other types of agricultural implements may be used. For example, the feed mixer 5 could be replaced with a manure spreader.

Figure 1B:
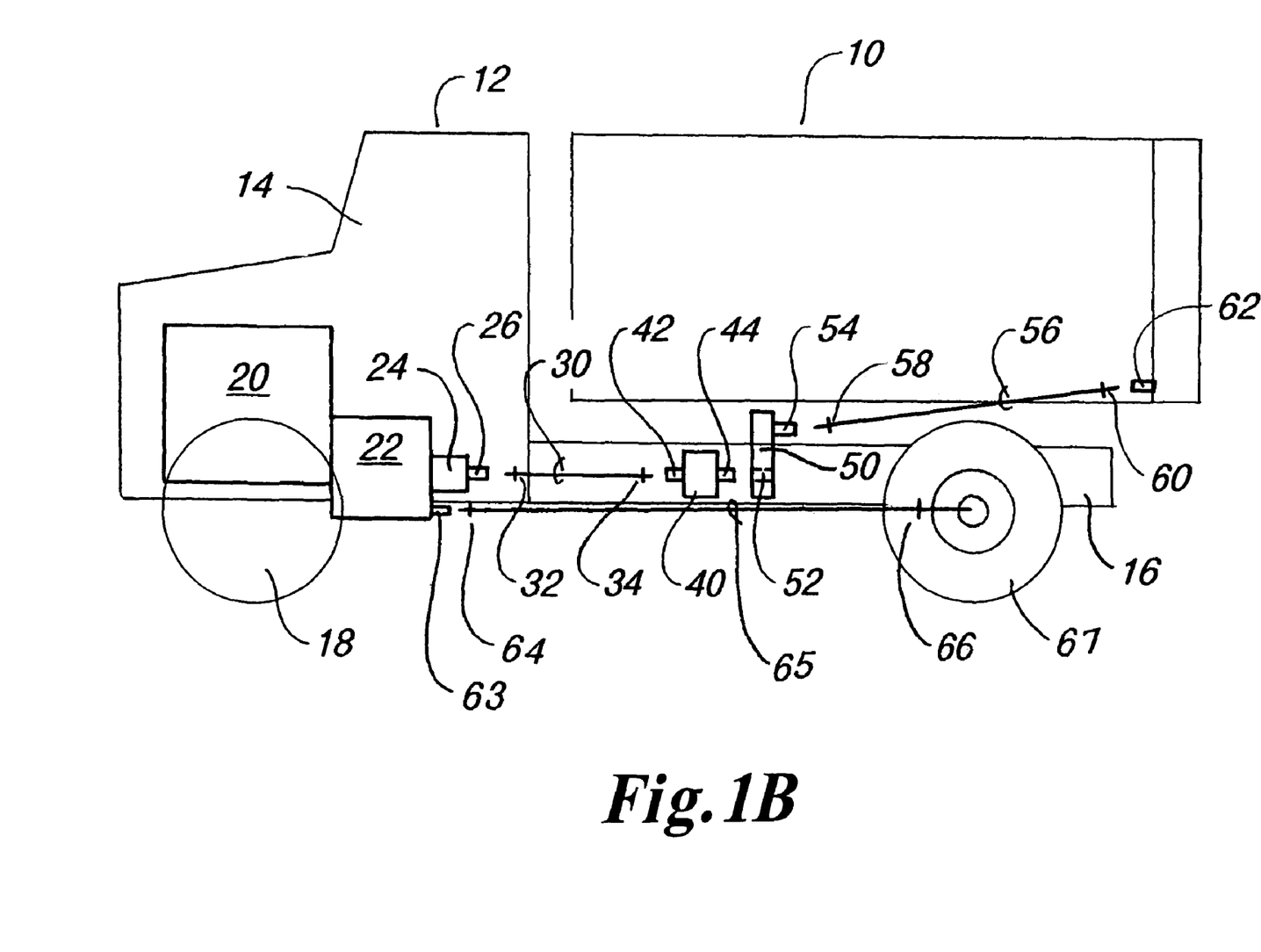
FIG. 1B is a side view of a non-limiting embodiment of a soft start clutch apparatus mounted within a truck chassis.

As shown in FIG. 1B, the vehicle 10 typically includes a truck chassis 12 comprising a cab 14, a frame 16, rear wheels 67, and front wheels 18. The chassis is generally powered by an engine 20 which is connected to a transmission 22 drivingly connected to the rear wheels 67 for propelling the chassis.

A transmission PTO 24 including a PTO output shaft 26 is attached to and driven by the transmission 22 to supply rotational power to auxiliary machinery 5 which is mounted on the frame 16. A PTO driveline 30 includes a first end 32 and a second end 34, with the first end 32 attached to the PTO output shaft 26. A soft start clutch 40 is included, comprising a clutch input 42 and a clutch output 44. The second end 34 of the PTO driveline 30 being attached to the clutch input 42 of the soft start clutch 40.

A reduction gearbox 50 includes a gearbox input 52 and a gearbox output 54. The clutch output 44 of the soft start clutch 40 is drivingly attached to the gearbox input 52. A machinery driveline 56 includes a first termination 58 and a second termination 60. The gearbox output 54 of the reduction gearbox 50 is connected to the first termination 58, and the second termination 60 is connected to the machinery drive input 62. As the reduction gearbox 50 is independent of the conventional PTO transmission, it is possible to customize the gear ratios and gear strengths of the reduction gearbox 50 to match the requirements of the driven machinery. For some applications, the running torque load of the driven machinery is 250-400 ft-lbs at a rotational speed of 2000 RPM. In some applications, the torque load is higher. For example, driven machinery such as a manure spreader may require a driving torque of more than a foot-ton. As the torque spike at startup may be approximately three times the driving torque, the torque spike for a manure spreader may be over several foot-tons. The design of the gearbox 50 may be chosen to accommodate a similarly high torque load. Accordingly, a combination of a soft start clutch 40 with a gear box 50 specifically selected to accommodate a high torque load results in a particularly robust, durable drive system. In one non-limiting embodiment, the gear box 50 has a gear ratio of 2:1. In another non-limiting embodiment, the gear box 50 has a gear ratio of 3:1. In a preferred embodiment, the gear box 50 is model number AP-635 A, available from COMER INDUSTRIES, and the soft start clutch 40 is model AHA200 available from CARLYLE JOHNSON MACHINE CO.

As further shown in FIG. 1B, the transmission 22 separately drives a transmission output 63 connected to the vehicle drive line front end 64. The drive line front end 64 is in turn connected to the vehicle rear end 66 by wheel driveline 65. Thus the rear wheels 67 of the vehicle are driven separately from the soft start clutch 40. Accordingly, the soft start clutch 40 may operate as long as the engine 20 is running, regardless of whether the vehicle 10 is moving.

As some agricultural implements accept rotational input in only a single direction, the soft start clutch 40 and accompanying gear box 50, transmission PTO 24 etc. may be configured to provide rotational power in only one direction. In this case, the system is simplified and may be more durable. In other applications, the system is arranged to provide rotational output in either direction as may be required by the equipment. In this case, versatility is added, but complexity may increase.

Other embodiments are possible. For example, the soft start clutch 40 may be implemented without a truck chassis 12 and associated cab and frame. In one exemplary embodiment, the soft start clutch 40 is implemented with a trailer pulled by a tractor.

Figure 2:
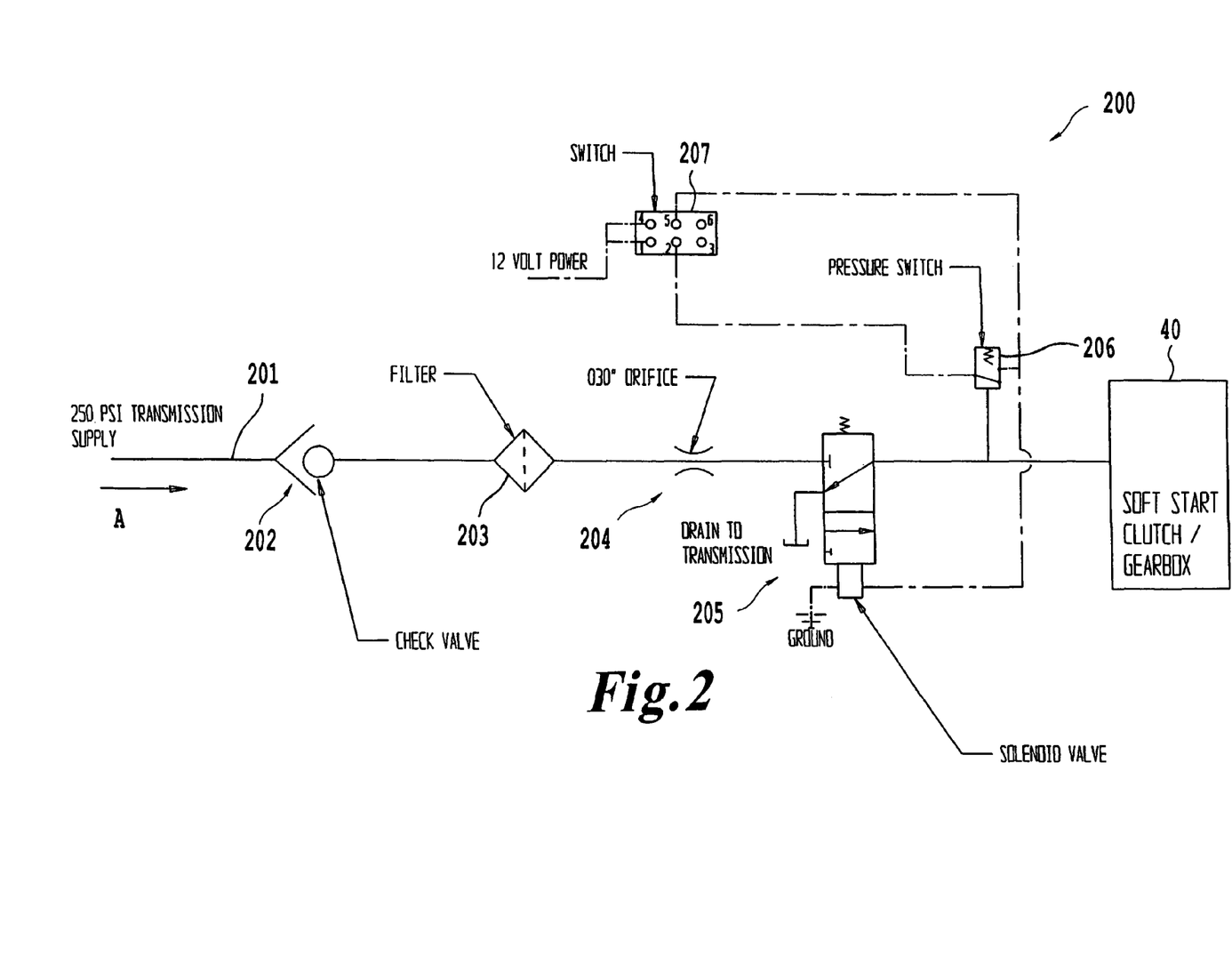
FIG. 2 is a diagram depicting a non-limiting embodiment of a fluid control circuit used in one embodiment of the invention.

FIG. 2 is an exemplary embodiment of a hydraulic control circuit 200 configured to operate with the soft start clutch 40. Typically, hydraulic fluid (or compressed air when operated pneumatically) is pressurized by a pump (not shown) and supplied to the hydraulic circuit 200. Hydraulic fluid will begin to flow in the direction of arrow A in the hydraulic circuit when the automatic valve 205 is actuated. The pressurized fluid passes through hydraulic line 201, through the check-valve 202, and then the filter 203. In a preferred embodiment, the filter 203 may be a hydraulic oil filter such as part number 9800K41 available from MCMASTER CARR. It should be noted that the order of the check-valve 202 and filter 203 may be reversed without detracting from the function of the hydraulic circuit 200. The check-valve prevents momentary decreases in fluid pressure from inadvertently causing the pressure supplied to the soft start clutch 40 from dropping. Such fluctuations can occur, for example, when the automatic transmission changes gears and could cause the soft start clutch 40 to accidentally disengage.

Once past the filter 203, the pressurized fluid passes through a flow restrictor or orifice 204 which regulates the flow rate of pressurized fluid reaching the soft start clutch 40. In other words, the orifice 204 restricts the amount of pressurized fluid passing through hydraulic line 201. By restricting the amount of pressurized fluid passing through hydraulic line 201, pressure applied to the soft start clutch 40, when actuated, will not immediately increase to the full pressure applied to the hydraulic control circuit 200. Rather, the pressure applied to the soft start clutch 40 will increase gradually over time. In one non-limiting embodiment, the soft start clutch 40 will completely engage over a period of at least one-half second. Preferably, the soft start clutch 40 will completely engage within 1-3 seconds. The term "completely engage" means that the clutch output and input rotate at the same speed. While the shock of the system may be softened by engagement over a period of time longer than three seconds, the longer the soft start clutch 40 is allowed to slip, the more heat is generated the more wear the soft start clutch 40 experiences. Thus, the soft start clutch 40 typically engages over a time period of 0.5 to 4.5 seconds and preferably over a time period of 1 to 3 seconds. The time period is the time from when the clutch begins to engage to the time the clutch is fully engaged. In one embodiment, the start up torque or torque spike is reduced to a level of less than twice the value of the operating torque. Thus, in the example from above, the 250 ft-lbs operating torque might normally have a torque spike of 500 to 750 ft-lbs. By using the soft start clutch of the present invention, the torque spike may be reduced to below 500 ft-lbs.

In one exemplary embodiment, the orifice 204 is an orifice with a fixed flow coefficient Cv. For example, the orifice could be a hydraulic fitting with a plug inside. A small hole, 0.30" dia, for example, is made in the plug to permit a restricted amount of pressurized fluid to pass through the fitting. In another embodiment, the orifice 204 may comprise a valve such as a needle valve or a globe valve and would have a variable flow coefficient. In a preferred embodiment, the check-valve 202 and the orifice 204 are combined into a single component such as a "checked orifice," part number FIFLCS-31-10-BR, available from O'KEEFE CONTROLS.

Once the flow of hydraulic fluid passes the orifice 204, the fluid encounters the automatic valve 205. The automatic valve 205 is preferably a solenoid valve. Typically, as the hydraulic control circuit 200 can be operated in conjunction with vehicles, any solenoid connected to the automatic valve can operate on the voltage supplied by the vehicle alternator, usually 12 VDC. However, other voltages are possible. Preferably, the automatic valve is a 2-position 3-way valve with a spring return. A preferred automatic valve is part number 379193-1 available from PARKER CHELSEA. When the valve is not energized (actuated), pressurized fluid flow is blocked from reaching the soft start clutch 40, and fluid between the automatic valve 205 and the soft start clutch 40 is allowed to flow out of the automatic valve to an area of low pressure so that fluid pressure on the soft start clutch 40 is relieved. Other types of valves such as 5-ported 4-way valves may be used to actuate the soft start clutch 40. Additionally, the orifice 204 and/or check-valve 202 may be incorporated directly into the automatic valve 205 such that a port supplying the soft start clutch 40 with pressurized fluid has the orifice 204 directly attached. For that matter, although the schematic of FIG. 2 shows lines between the individual components, any of the components may be directly attached to any other as the lines on the schematic are merely to indicate the fluid flow path and are not meant to indicate a distance or type of connection between components.

It should be noted that the preferred mode of operating the soft start clutch 40 is to gradually engage the soft start clutch 40, but to rapidly disengage the soft start clutch 40. In other words, the soft start clutch 40 turns on slowly (e.g., from one to three seconds), but turns off quickly (e.g., in one second or less). One benefit of this method is that the torque spike applied to the PTO and PTO clutches at startup is reduced. Additionally, the rapid disengagement of the soft start clutch 40 enhances safety by allowing a quick emergency shutdown of moving equipment. Further, a quick disengagement reduces unnecessary slippage and improves durability of the soft start clutch. Thus, the soft start clutch 40 preferably completely disengages in a period of one second or less.

As further shown in FIG. 2, a pressure switch 206 is provided to monitor the pressure applied to the soft start clutch 40. In a preferred embodiment, the pressure switch 206 is part number 379305 available from PARKER CHELSEA. As excessive slippage can destroy the soft start clutch 40, the pressure switch 206 can provide a control signal to the controller 207 to disengage the soft start clutch 40 if the pressure applied is below a predetermined value. Thus, the soft start clutch 40 is protected from burning out from friction caused by incomplete engagement during rotation. The pressure switch 206 can be a simple spring/diaphragm type pressure switch or the like with on/off control of an electrical contact or may be a more sophisticated component such as a pressure transducer etc. that provides an analog or digital signal.

Controller 207 can be a simple electric control box such HONEYWELL MICRO SWITCH part number 2NT1-50, or may comprise part of a more complex system such as a programmable logic controller (PLC). FIG. 2 shows broken lines to indicate control wiring. In one exemplary embodiment, the controller 207 includes a momentary override state that allows the automatic valve 205 to engage despite a signal from the pressure switch 206 that the pressure supplied to the soft start clutch 40 is below the predetermined threshold for actuation. Thus, during start up, pressurized fluid may be supplied to the soft start clutch 40 in order to increase the pressure to a level above the predetermined threshold.

Figure 3A:
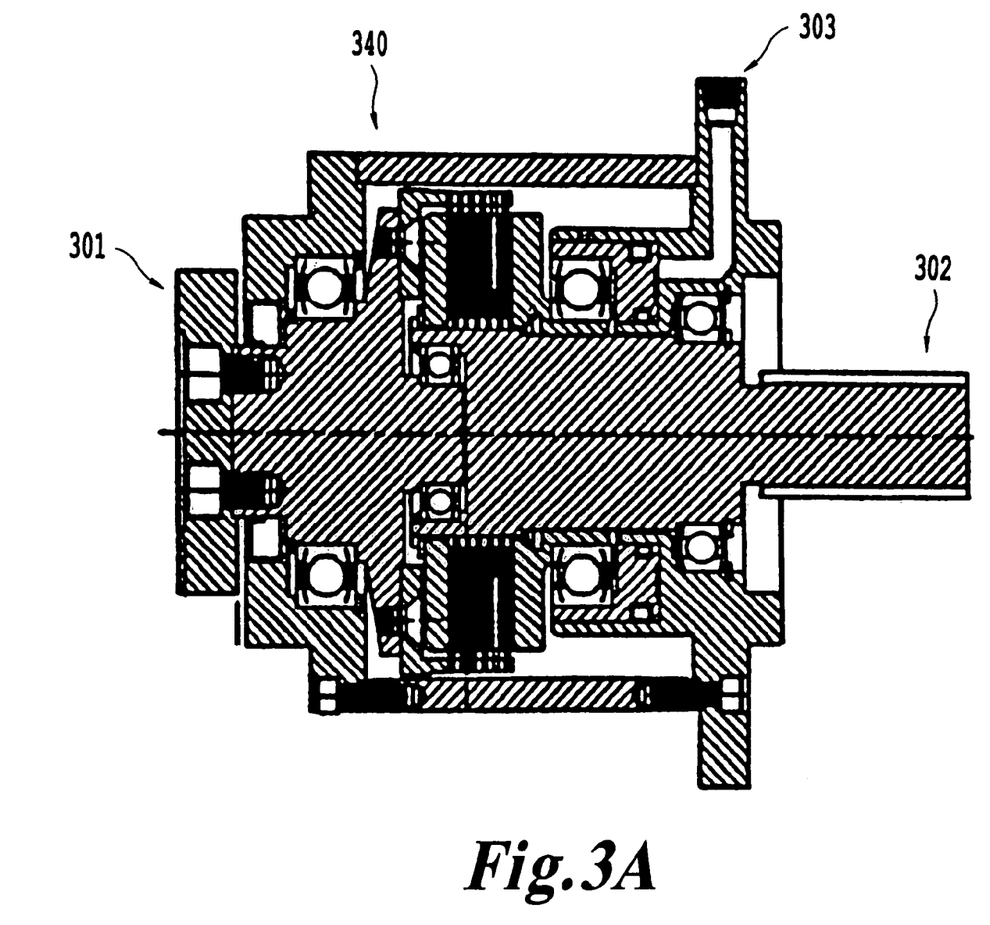
FIG. 3A is a side view of a non-limiting embodiment of a clutch used in the present invention.
Figure 3B:
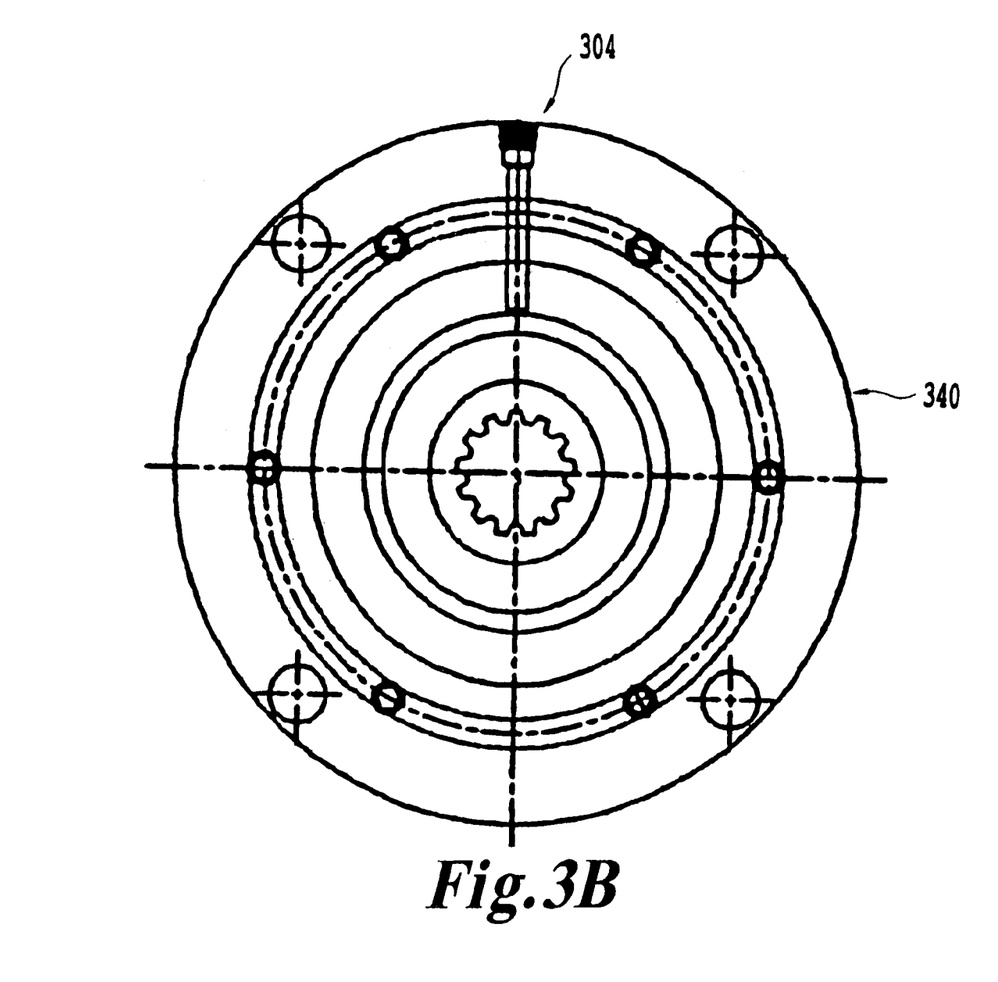
FIG. 3B is a front view of a non-limiting embodiment of a clutch used in the present invention.

FIGS. 3A and 3B show one exemplary embodiment of a hydraulic clutch 340 used in the present invention. The hydraulic clutch 340, in conjunction with the control circuit 200 function as the soft start clutch 40 shown in FIGS. 1b and 2.

As shown in FIG. 3A, the hydraulic clutch 340 includes a flange 301 for connection to a mating flange on the PTO drive line 30. A threaded connection 302 is configured to connect to the gear box 50. The hydraulic clutch 340 receives a hydraulic fluid signal via port 303. The hydraulic clutch 340 is only one example of the clutches that may be used in the present invention and other types of clutches may be used.

OPERATION

In the operation of the soft start clutch 40, the driven machinery is typically mounted on a truck chassis or towed behind a tractor. The soft start clutch 40 is typically propelled during the use of the machinery, for example, while feeding livestock with a mixer, or spreading manure with a spreader. The machinery is also powered by the propelling vehicle's engine, and this rotational power can be engaged and disengaged from the vehicle by the soft start clutch 40 to operate the machinery. When the machinery is started, a soft start clutch 40 is slowly engaged with pneumatic or hydraulic pressure to connect the engine-powered output with the input shaft of the machinery. The soft start clutch 40 slips for a short period of time, then fully engages to power the machinery. Thus, shock to the PTO and the machinery is reduced. The system functions with any type of transmission and allows engagement and disengagement of the PTO independently of the PTO clutches.

In one mode of operation, the PTO is continuously engaged with the engine via its own transmission. The soft start clutch 40 is then used to engage and disengage the PTO from the driven machinery. Thus, the PTO transmission itself is spared the wear and tear that occurs with each transition between engagement and disengagement of driven machinery, and this wear and tear is instead accommodated by the soft start clutch 40 and gear box 50. As the soft start clutch 40 and gear box 50 are typically more robust than the PTO transmission itself, the overall system can be made more durable. Further, the soft start clutch 40 and gear box 50 are typically more accessible, and therefore, more serviceable than conventional PTO transmissions. In other embodiments, the PTO transmission is omitted entirely. In still other embodiments, the PTO transmission is used to disengage the driven machinery from the engine 20, and the soft start clutch 40 is used to engage the machinery.

Although only certain exemplary embodiments of inventions have been described in detail above for use with agricultural systems, those skilled in the art will readily appreciate that many modifications are possible in the exemplary embodiments without materially departing from the novel teachings and advantages of this invention. For example, the soft start clutch system can be used for other industrial equipment such as highway construction equipment, mining equipment, and mobile material processing equipment etc.

Accordingly, by operating a clutch that gradually couples rotational power from the engine to the PTO, torque shock is reduced. Additionally, separate gear boxes more capable of handling heavy loads associated with agricultural implements such as manure spreaders and feed mixers can be used. Further, the present invention provides a robust, adaptable system that reduces problems associated with manual transmissions and automatic transmissions with or without torque converters.

The invention claimed is:

1. An agricultural implement system comprising:
   a propelling vehicle with an engine and an automatic transmission;
   a soft start clutch drivingly connected to a rotary machinery drive input of an agricultural implement;
   a transmission PTO attached to said automatic transmission and drivingly connected to the soft start clutch such that no torque converter is connected between the soft start clutch and the engine; and
   a control circuit configured to completely engage the soft start clutch, via pressurized fluid, over a time period of at least 0.5 seconds,
   wherein the control circuit further comprises a valve disposed in series fluid communication with a flow restrictor configured to limit a flow rate of pressurized fluid supplied to the soft start clutch, and
   wherein the flow restrictor and valve are disposed between a pressurized fluid supply and the soft start clutch.

2. The agricultural implement system of claim 1, wherein the agricultural implement is a feed mixer.

3. The agricultural implement system of claim 1, wherein the agricultural implement is a manure spreader.

4. The agricultural implement system of claim 1, wherein the time period is from 1 to 3 seconds.

5. The soft start clutch system of claim 1, wherein the control circuit further comprises a valve system configured, in a first position, to supply pressurized fluid to actuate the soft start clutch and configured to, in a second position, relieve the soft start clutch of pressurized fluid.

6. The soft start clutch system of claim 5, wherein the control circuit further comprises a check-valve configured to permit the pressurized fluid to flow along a fluid path in a direction to engage the soft start clutch and configured to prevent the pressurized fluid from flowing along a fluid path to disengage the soft start clutch.

7. A soft start clutch system comprising:
   a propelling vehicle with an engine and a transmission;
   a soft start clutch configured to drivingly connect to a machinery drive input;
   a transmission PTO attached to said transmission and configured to drivingly connect to the soft start clutch; and a control circuit configured to completely engage the soft start clutch over a time period of at least 0.5 seconds,
   wherein the control circuit further comprises a valve disposed in series fluid communication with a flow restrictor configured to limit a flow rate of pressurized fluid supplied to the soft start clutch, and
   wherein the flow restrictor and valve are disposed between a pressurized fluid supply and the soft start clutch.

8. The soft start clutch system of claim 7, wherein the soft start clutch engages at a first rate and disengages at a second rate.

9. The soft start clutch system of claim 8, wherein the first rate is slower than the second rate.

10. The soft start clutch system of claim 8, wherein the first rate is the same as the second rate.

11. The soft start clutch system of claim 7, wherein the control circuit is at least one of a hydraulic or a pneumatic circuit.

12. The soft start clutch system of claim 7, wherein said transmission comprises an automatic transmission.

13. The soft start clutch system of claim 7, wherein the control circuit is configured to engage the soft start clutch over a time period of 1 to 3 seconds.

14. The soft start clutch system of claim 13, wherein the control circuit is configured to completely disengage the soft start clutch in a time period of less than one second.

15. A soft start clutch system comprising:
a propelling vehicle with an engine and a transmission;
a soft start clutch configured to drivingly connect to a machinery drive input;
a transmission PTO attached to said transmission and configured to drivingly connect to the soft start clutch; and
a control circuit configured to completely engage the soft start clutch over a time period of at least 0.5 seconds,
wherein the control circuit is at least one of a hydraulic or a pneumatic circuit,
wherein the control circuit comprises a flow restrictor configured to limit a flow rate of pressurized fluid supplied to the soft start clutch,
wherein the control circuit further comprises a valve system configured, in a first position, to supply pressurized fluid to actuate the soft start clutch and configured to, in a second position, relieve the soft start clutch of pressurized fluid, and
wherein the control circuit further comprises a pressure sensor configured to monitor a pressure of the pressurized fluid supplied to the soft start clutch.

16. The soft start clutch system of claim 15, wherein the pressure sensor is configured to disable the soft start clutch when the pressure of the pressurized fluid supplied to the soft start clutch is below a predetermined value and the control circuit further comprises an override configured to temporarily override the pressure sensor to prevent the pressure sensor from disabling the soft start clutch.

17. A soft start clutch system comprising:
a propelling vehicle with an engine and a transmission;
a soft start clutch configured to drivingly connect to a machinery drive input;
a transmission PTO attached to said transmission and configured to drivingly connect to the soft start clutch; and
a control circuit configured to completely engage the soft start clutch over a time period of at least 0.5 seconds,
wherein said soft start clutch further comprises a clutch input and a clutch output, and said clutch output drives a gearbox input of a reduction gearbox having a gearbox output drivingly connected to said machinery drive input.

18. The soft start clutch system of claim 17, said apparatus including a machinery driveline with a first termination and a second termination, said first termination connected to said gearbox output, and said second termination connected to said machinery drive input.

19. The soft start clutch system of claim 17, said reduction gearbox configured with a 2:1 reduction ratio.

20. The soft start clutch system of claim 17, said reduction gearbox comprising a belt drive.

21. The soft start clutch system of claim 17, said reduction gearbox comprising toothed gearing.

22. A soft start clutch system comprising:
a propelling vehicle with an engine and a transmission;
a soft start clutch configured to drivingly connect to a machinery drive input;
a transmission PTO attached to said transmission and configured to drivingly connect to the soft start clutch; and
a control circuit configured to completely engage the soft start clutch over a time period of at least 0.5 seconds,
wherein the soft start clutch is configured to operate at a running torque of 250-400 ft-lbs.

23. A soft start clutch system comprising: a propelling vehicle with an engine and a transmission; a soft start clutch configured to drivingly connect to a machinery drive input; a transmission PTO attached to said transmission and drivingly connected to the soft start clutch; and means for completely engaging the soft start clutch over a time period of at least 0.5 seconds,
wherein the control circuit further comprises a valve disposed in series fluid communication with a flow restrictor configured to limit a flow rate of pressurized fluid supplied to the soft start clutch, and
wherein the flow restrictor and valve are disposed between a pressurized fluid supply and the soft start clutch.

24. A soft start clutch system comprising: a transmission with two rotary outputs;
a PTO driveshaft connected to a first output;
a soft start clutch connected to the PTO driveshaft;
a gear box connected to the soft start clutch;
a vehicle driveshaft connected to a second output of the transmission and configured to rotate wheels of a vehicle; and
a control circuit configured to completely engage the soft start clutch over a time period such that a start up torque is less than twice a value of an operating torque.

25. The soft start clutch system of claim 24, wherein the time period is at least 0.5 seconds.

26. The soft start clutch system of claim 24, wherein the time period is from 1 to 3 seconds.

27. The soft start clutch system of claim 24, wherein the soft start clutch is configured to engage at a first rate and configured to disengage at a second rate, and the first rate is slower than the second rate.

28. A method of installing the soft start clutch system of claim 7, comprising:
connecting the soft start clutch to a PTO drive line; connecting the PTO drive line to the transmission PTO;
connecting the soft start clutch to a gear box;
connecting the gear box to a driveline; connecting the drive line to the machinery drive input; and
connecting the control circuit to the soft start clutch.

* * * * *